Feb. 20, 1923.
1,446,368.
A. ZILBERSHER.
ROAD AND STREET CUTTER.
FILED SEPT. 30, 1921.
2 SHEETS—SHEET 2.
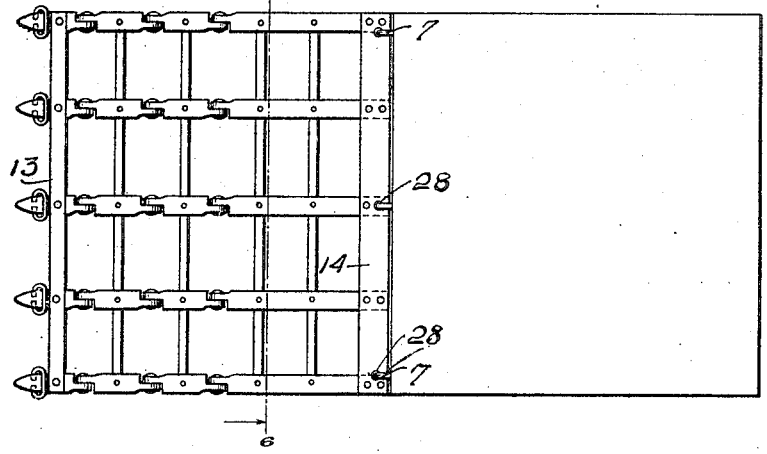
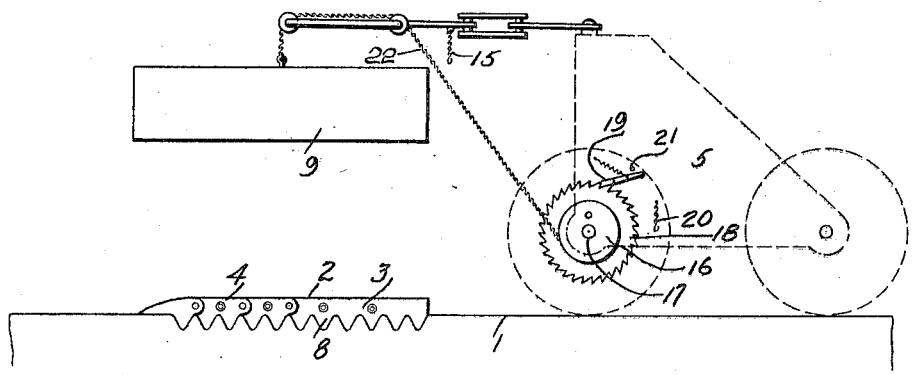
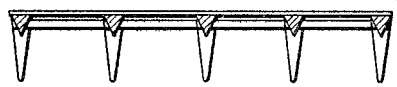
WITNESSES
INVENTOR
ABRAHAM ZILBERSHER
BY
ATTORNEYS Patented Feb. 20, 1923.

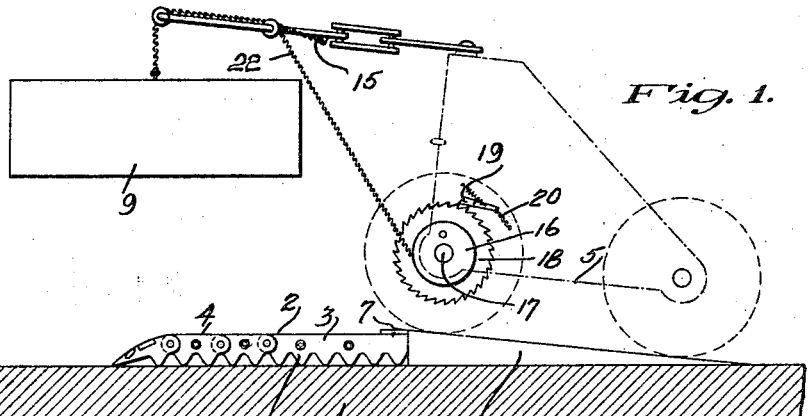
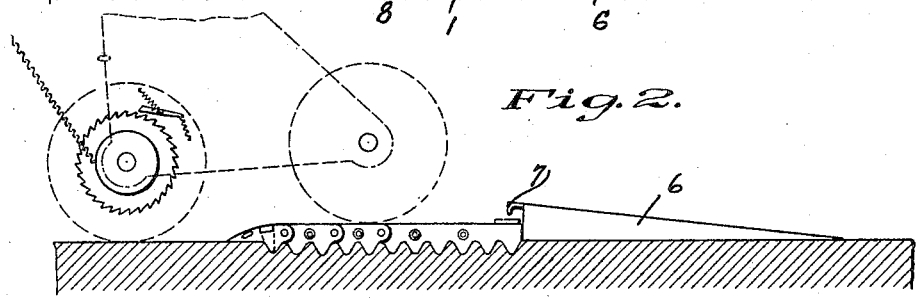
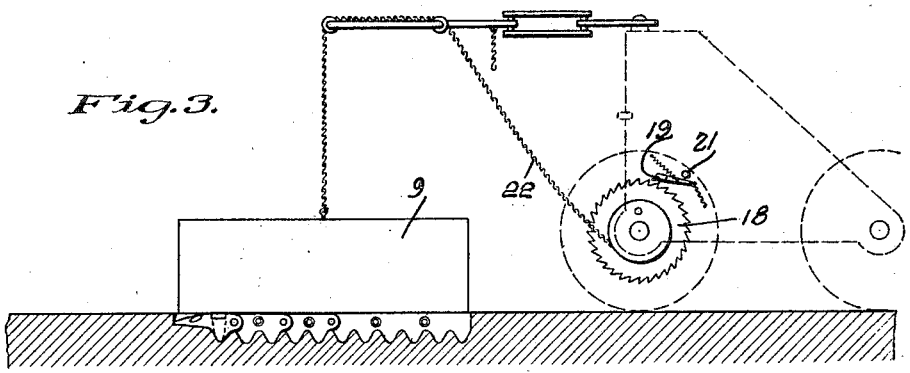
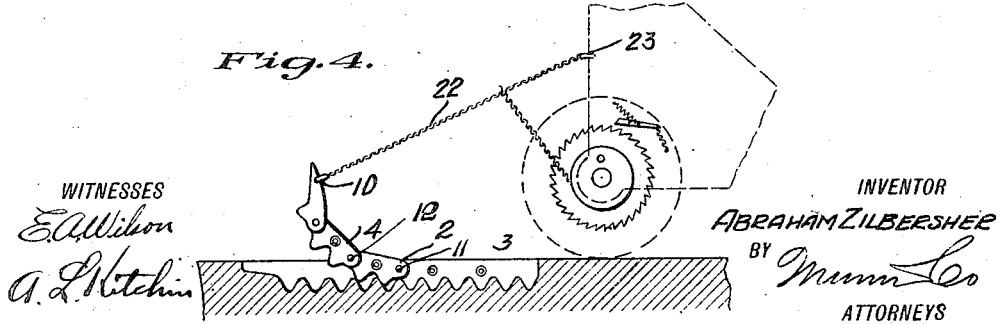

1,446,368

UNITED STATES PATENT OFFICE.

ABRAHAM ZILBERSHER, OF NEW YORK, N. Y.

ROAD AND STREET CUTTER.

Application filed September 30, 1921. Serial No. 504,424.

*To all whom it may concern:*

Be it known that I, ABRAHAM ZILBERSHER, a citizen of the United States, and a resident of the city of New York, borough of Manhattan, in the county and State of New York, have invented a new and Improved Road and Street Cutter, of which the following is a full, clear, and exact description.

This invention relates to cutting devices for roadways and has for an object to provide an improved construction wherein the roadway may be cut into small sections so as to have the surface easily removed.

Another object of the invention is to provide a cutter for asphalt roadways wherein a structure is presented which will readily cut the roadbed when pressed by a roller or other weight, the arrangement being such that the cutter may be readily removed after the cutting operation.

A still further object of the invention is to provide an improved cutter for cutting the surface of roadways at points where the same is to be repaired, the arrangement being such that the cutter will substantially fit over the surface to be removed and when pressed will cut the surface into small sections for easy removal.

In the accompanying drawings—

Figure 1 is a fragmentary sectional view through a roadway on which is mounted a cutter disclosing one embodiment of the invention together with a roller and guide therefor.

Figure 2 is a view similar to Figure 1 but showing the roller after it has substantially passed over the cutter.

Figure 3 is a view similar to Figure 1 but showing the parts in an operated position with the weight resting on the cutter.

Figure 4 is a view similar to Figure 3 but showing in action the roller when pulling the cutter out of the roadway.

Figure 5 is a top plan view of the construction illustrated in Figure 1.

Figure 6 is a transverse sectional view through Figure 5 on line 6—6.

Figure 7 is a view similar to Figure 3 but showing the weight elevated and the parts ready to release the weight.

Figure 8 is a view similar to Figure 6 and is to be hereinafter referred to.

Referring to the accompanying drawings by numeral, 1 indicates a roadbed of any kind, as for instance, a roadbed covered with asphalt. Roadways of this kind and also other forms of roadway often need repairing in spots and the practice heretofore has been to use a pick in digging up the old asphalt or other coating and then providing a new coating. Sometimes a burner has been used for burning off asphalt for repair work but this is rather slow and more or less expensive.

In the present invention, a construction is provided which will quickly and easily cut into small sections either a large or small section of roadway so that it may be either removed by a pick or other means and a new coating supplied. In order to carry out this intention, a cutter 2 is provided which is shown as being divided into sections 3 and 4. If the place to be cut out is large a number of the cutters 2 are arranged in line and a suitable roller 5 passed thereover. If desired, some other form of weight may be used though an ordinary steam roller is very satisfactory. However, in order that the steam roller 5 shall easily move on to the upper surface of the cutter 2, an inclined wedge member 6 is provided which may be of wood or other material and which is provided with one or more hooks 7 adapted to fit into suitable openings 28 in the cutter 2 so that the cutter will not move away from the wedge as the roller moves thereon but will move directly downward and be pressed into the roadway 1 as shown in Figure 2. As soon as the roller is moved off of the wedge 6, it is taken away and if desired the roller is passed several times over the cutter. Ordinarily the passage of the roller over the cutter will not cause the same to enter the concrete any further than the depth of the various teeth 8. In order to cause the cutter to penetrate or cut the asphalt covering from the top to the bottom, a weight 9 is provided which is dropped one or a large number of times on to the cutter 2. The operation of dropping the weight on the cutter is maintained until preferably the cutter has assumed the position shown in Figure 3. As the cutter is forced into the asphalt or other surfacing matter, it is naturally tightly wedged into the surface and, consequently, it will be more or less difficult to remove manually. However, a chain or other connecting member 22 is secured to the roller 5 in any suitable manner into suitable rings 10 connected with the cutter 2. The roller is then backed off as shown in Figure 4 and the respective sections of the roller are successively pulled out of the roadbed. It will be noted that the sections 3 and 4 are hinged together at 11 so as to make two sections, but if desired, the device could be made solid or could be made into more than two sections.

The section 4 is preferably made into a number of short sections or links which may be hinged as at 12. The forward or end links of the respective parts of section 4 are connected together by a front cross bar 13 whereby they will remain in alignment with the various parts of section 3, said section 3 being preferably connected by a cross bar 14 in which the apertures 8 are provided. In this way, the short links are pulled out first and finally the section 3 is removed when the roller is backed off as shown in Figure 4.

In regard to the weight 9 and the way it operates, it is intended that the weight shall be automatically operated during the hammering or dropping action. When the roller is first brought into use, the parts are arranged as shown in Figure 1 with the weight elevated and held in an elevated position by the short chain 15 hooked into the chain 22. The drum 16 is loosely mounted on a stub shaft 17 secured to the roller in any desired manner. As the drum is loosely mounted on the stub shaft the rotation thereof will not affect the drum or the chain 22. A ratchet wheel 18 is rigidly secured to the drum 16 and co-acts with a spring pressed pawl 19, said pawl being pivotally mounted on to the rotating drums of the roller 5. After the roller 5 has been moved to the position shown in Figure 2, member 6 will be removed and the roller moved back to the position shown in Figure 7, after which, the pawl 19 is manually released but is not connected to the restraining chain 20. As the roller 5 is moved backward, it will cause the drum 16 to rotate and wind up the chain so as to elevate the weight. When the weight has been elevated to the proper extent, the hook at the end of chain 15 is engaged with the chain 10 as shown in Figure 1 and the weight again brought to a position over the cutter. The chain 15 is manually released and the weight allowed to drop. This operation continues as often as may be necessary to drive the cutter into the roadbed as shown in Figure 3.

As an alternative way of raising and lowering the weight, the parts are caused to assume the position shown in Figure 3 and the pawl 19 is released. As the roller moves back the pawl will merely pass around the ratchet wheel 18 and unwind part of chain 22. It will be noted that as the roller moves backwardly the pawl 19 will merely slip over the teeth of ratchet wheel 18 but when the roller is reversed and is moved toward the weight, the pawl will engage one of the teeth of the ratchet wheel and will rotate the drum whereupon the weight will be elevated and the parts will be in the position shown in Figure 7 when the ratchet wheel 18 has made one revolution. If desired the pawl 19 can be manually released at this time, but it is preferable to have a pin 21 secured to a stationary part of the roller 5, and which projects in the path of movement of the outer end of the pawl, and when the pawl reaches the second pin 21 it is depressed, and swings its forward end from engagement with the ratchet 18. This will cause the weight to drop and the drum to unwind so that the parts will be substantially in the position shown in Figure 3. The roller is backed off a second time and the operation repeated. This operation may be repeated as often as necessary. When this operation has been completed, the weight is elevated and the chain 15 positioned as shown in Figure 1. One or more chains 22 are then connected with suitable hooks 23 and with the links or rings 11 so that when the roller has moved as shown in Figure 4 the cutter will be pulled out of the roadbed. It is, of course, evident that the teeth 8, see Figures 6 and 8, of the cutter may be short or long as desired so as to cut only the upper surface of the roadbed or cut entirely through the base of the roadbed.

The cutter has been shown as a square structure but it will be evident that it may be round or of some other shape without departing from the spirit of the invention. After the cutter has been removed as shown in Figure 4, the cut part of the asphalt may be readily removed and a new supply provided and rolled in place if desired. Also, if desired, a metal boxing might be arranged in the depression or opening caused by the cutter and the asphalt placed therein and pressed down to an even thickness. When this has been done the boxing is removed before the asphalt completely sets and a final rolling is provided for causing the new asphalt to adhere to the walls of the old.

What I claim is:—

1. A road and street cutter of the character described comprising a frame substantially wedge-shaped in cross section, and a plurality of wedge-shaped linked cutters carried by the frame.

2. A road and street cutter comprising a frame acting as a cutter, said frame having cutting edges, and a plurality of auxiliary cutters carried by said frame, said frame and auxiliary cutters being divided into sections and hinged together, said hinges being arranged in alignment.

3. A road and street cutter comprising a frame having a cutting edge, a plurality of auxiliary linked cutters carried by said frame, and a plurality of rings carried by the frame adapted to be engaged when the cutter is being disengaged after the cutting operation.

4. A cutter for roadways and streets comprising a frame having cutting edges and a plurality of depending perforating spurs, and a plurality of auxiliary cutters carried by the frame having cutting edges and auxiliary spurs projecting beyond the cutting edges.

5. In a road and street cutter, a wedge-shaped guide having a plurality of hooks, a cutting member comprising a frame having openings for receiving said hooks, and a plurality of auxiliary cutters, said wedge acting as a guide for a roller to be moved to a position on top of said cutter for pressing the same into a roadway, and means adapted to be connected with the cutter and with the roller for permitting the roller to pull the cutter out of the roadway.

6. A cutter for roadways and streets comprising a frame, said frame having wedge-shaped cutting portions and a number of depressions therein for receiving a guiding member, a plurality of rings carried by said frame for receiving power means for raising the same, and a plurality of cutters removably mounted on the frame.

ABRAHAM ZILBERSHER.